Feb. 21, 1939.    W. VUTZ    2,148,311
MOWING MACHINE
Filed May 10, 1938    2 Sheets-Sheet 1
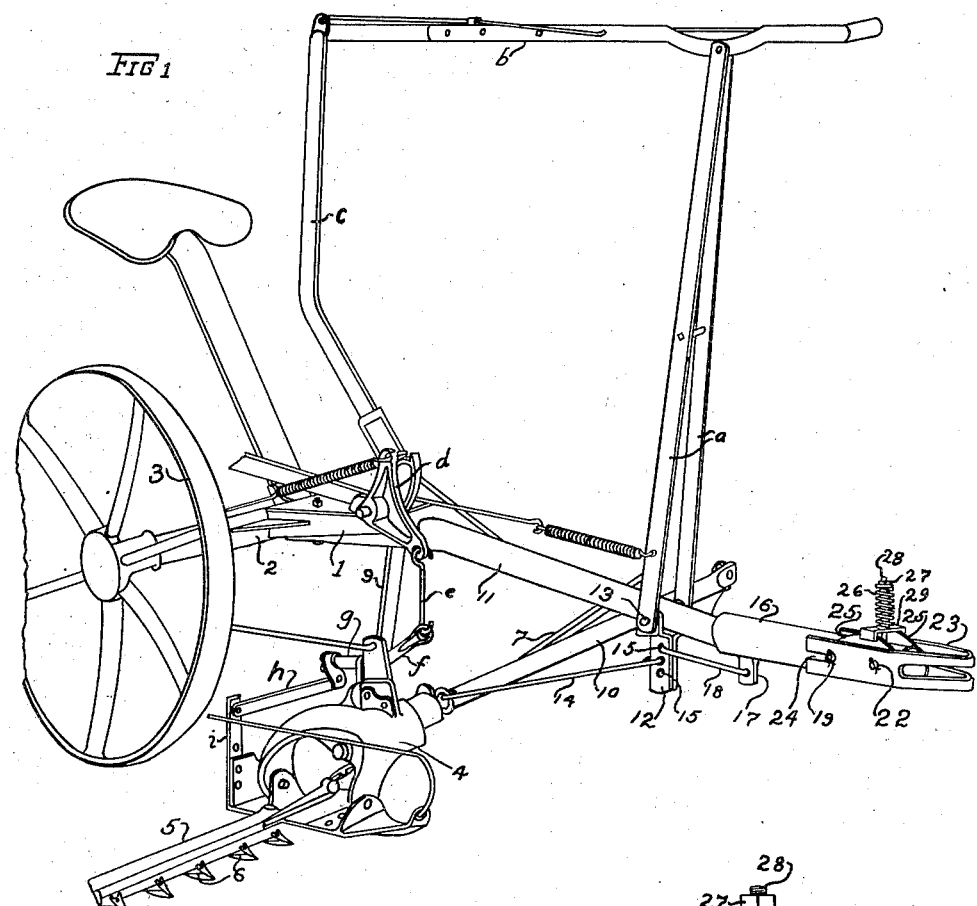
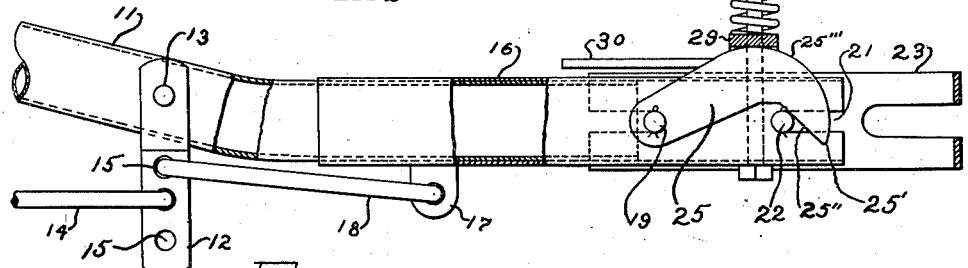
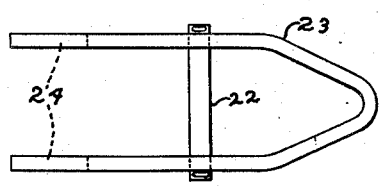

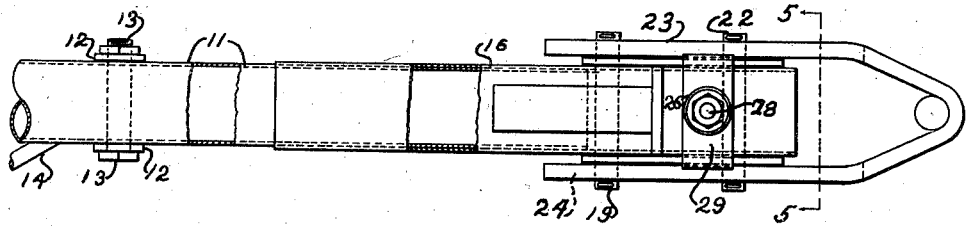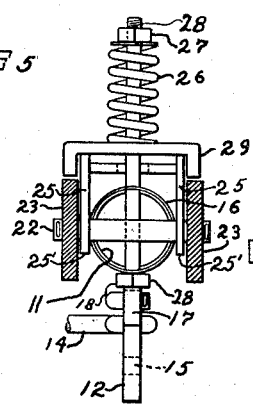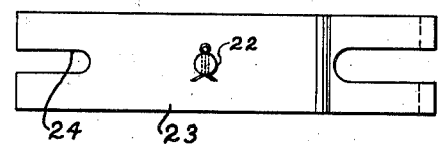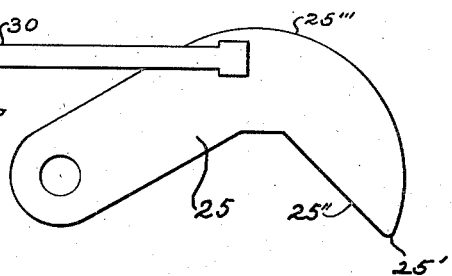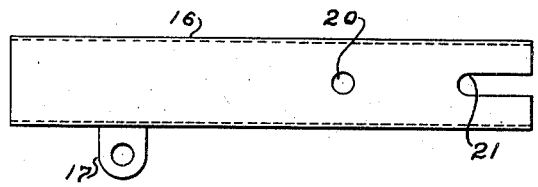

Patented Feb. 21, 1939

2,148,311

UNITED STATES PATENT OFFICE 2,148,311

MOWING MACHINE

Wilhelm Vutz, Coldwater, Ohio, assignor to New Idea, Inc., Coldwater, Ohio, a corporation of Ohio Application May 10, 1938, Serial No. 207,067

7 Claims. (Cl. 56—25)

This invention relates to improvements in mowing machines, it more particularly relating to a hitch for a tractor.

In mowing machines which are horse-drawn it has been the common practice to provide means for equalizing the draft between the mower frame proper and the cutter bar so as to provide proper division between the draft of the cutter bar and mower frame, the amount of draft going to the frame being such as to be proportionate to the power transmitted from the carrying wheels to the cutting mechanism plus the pull necessary to move the mower frame forward. When drawing a mower by animal power the method of hitching as a rule provides sufficient resiliency to protect the mower from damage if the cutter bar should hit an obstruction.

In adapting the conventional type of horse-drawn mower to tractor use, the draft equalizing feature described is usually sacrificed to gain simplicity in the hitch; that is, the draft is applied entirely to the frame of the machine, the equalizer and the draft connection to the cutter bar being omitted, reliance being had upon the auxiliary frame which connects the cutter bar head to the main frame to exert a push upon the cutter bar head, the entire direct draft strain of the tractor being exerted through the main frame of the machine. An objection to this arrangement is that since the rear member of the auxiliary frame slants upwardly toward the rear, in heavy pulling this induces a tendency to lift the mower wheels, the right hand wheel especially, off the ground, thus robbing the ground wheels of traction when most needed.

One of the objects of the present invention is to provide a hitch between the machine and the tractor such that a portion of the draft is applied to the main frame of the machine and a portion of the draft to the head of the cutter bar in much the same manner and with the consequent advantages of the old form of horse-drawn hitch.

A further object of the invention is to provide a hitch for a tractor such that the hitch device may be separated or disconnected when an undue strain is brought upon the cutter bar to obviate damage.

In the accompanying drawings:

Fig. 1 is a perspective view of so much of a mowing machine as is necessary to illustrate my improvements.

Fig. 2 is a side elevation partly broken away and shown in section of my improved hitch device.

Fig. 3 is a plan view of the clevis of the hitch and the coupling pin which it carries.

Fig. 4 is a top plan view of the part shown in Fig. 2.

Fig. 5 is a section on the line 5—5 of Fig. 4.

Fig. 6 is a side elevation of the clevis and its coupling pin.

Fig. 7 is a side elevation of one of the coupling latches of the hitch.

Fig. 8 is a side elevation of the tube which forms a part of the hitch mechanism.

Referring to the drawings, 1 represents the frame of the mower having the usual axle extensions, one of which is shown at 2 and upon the end of which is journalled one of the carrying wheels 3. The cutter bar head is indicated at 4 and carries in the usual way the cutter bar 5 and reciprocating cutter 6 which is reciprocated in the usual way by the pitman rod 7. This cutter bar head is secured to the main frame of the mower in the usual way by an auxiliary A-frame indicated at 9 and 10, the member 9 being secured to the frame 1 and the member 10 being secured to the extension (not shown) at the other end of the main frame which carries the mechanism which reciprocates the rod 7 which is not shown in the present case. The main frame 1 has the usual forwardly extending stub pole 11.

In horse-drawn mowers, it has been usual, as before stated, to apply the draft to the frame of the machine through this stub pole 11 and also to the cutter bar head through the medium of an equalizer 12 which is in the present case of a Y-shape pivotally connected to the stub pole 11 by a bolt 13 and pivotally connected to the head 4 by a rod 14, this rod being pivoted to the equalizer 12 through any one of a series of openings 15 to secure the proper proportionate draft.

In order to retain the function and advantage of this draft equalizer for a tractor hitch, I make use of the following construction:

Slidably mounted upon the outer end of the stub pole 11, which is of tubular form, is a sleeve 16 which has on the under side thereof an ear 17 which is pivotally connected with the equalizer 12 by a rod 18. This sleeve carries a pin 19 which is closely fitted in a transverse aperture 20 in the sleeve. The outer end of the sleeve has an open-ended slot 21 which receives a pin 22 which is carried by a clevis 23; each of the sides of the clevis 23 having at its inner end an open-ended slot 24 which fits over the pin 19.

Pivotally mounted upon the pin 19 are two latches 25, the free end of each of these latches being curved to form a nose 25' having inclined faces 25'' which engage the pin 22. These latches are held in spring-pressed engagement with the pin 22 by a coil spring 26 which is interposed between the nut 27 of a bolt 28 and the cross bar 29 which rests upon cam surfaces 25''' upon the latches. In the event that an undue obstruction is met with by the cutter devices, these latches will yield against the tension of the spring 26 and permit the pin 22 carried by the clevis to become disengaged therefrom so that the hitch devices become uncoupled. The latches 25 are preferably connected by a T-shaped bar 30 which when the latches are released prevent the latch from dropping by reason of the contact of the bar with the clevis 23.

The parts indicated at a, b, c, d, e, f, g, h and i are merely the usual raising and lowering devices for the cutter bar and knife and are not a part of the present invention.

Having thus described my invention, I claim:

1. In a mowing machine, a main frame, a pole extending forwardly from said frame, an equalizing member pivotally connected to said pole, a cutter bar head, means for pivotally connecting said head to said equalizing device, a pair of detachably connected tractor hitch members, one of which is slidably mounted on said pole and pivotally connected with said equalizing member, and means for automatically disconnecting said tractor hitch members upon an undue strain.

2. In a mowing machine, a main frame, a pole extending forwardly from said frame, an equalizing member pivotally connected to said pole, a cutter bar head, means for pivotally connecting said head to said equalizing device, a pair of detachably connected tractor hitch members, one of which is slidably mounted on said pole and pivotally connected with said equalizing member, means for automatically disconnecting said tractor hitch members upon an undue strain, comprising a latch member pivotally connected to one of said members and engaging the other member, and a spring for holding said latch member in engaging position yieldable under undue strain upon the parts.

3. In a mowing machine, a main frame, a pole extending forwardly from said frame, an equalizing member pivotally connected to said pole, a cutter bar head, means for pivotally connecting said head to said equalizing device, a pair of detachably connected tractor hitch members, one of which is slidably mounted on said pole and pivotally connected with said equalizing member, means for automatically disconnecting said tractor hitch members upon an undue strain, and a pair of latches pivotally connected to one of said hitch members and engageable with the other hitch member, a cross bar, and a spring for pressing said cross bar against said latches to hold said hitch members in connected relation but to be separated upon undue strain upon the parts.

4. In a mowing machine, a main frame, a pole extended forwardly of said frame, an equalizing member pivotally connected with said pole, a sleeve slidably mounted upon said pole, means for pivotally connecting said sleeve with said equalizing member, a pin carried by said sleeve, a pair of latches pivoted upon said pin, a clevis slidably associated with said sleeve, a pin carried by said clevis adapted to be engaged by said latch members, a spring for holding said latch members in engagement with said last mentioned pin, each of said latch members having an inclined portion cooperating with said last mentioned pin whereby said latch members will be forced out of engagement with said last mentioned pin against the tension of said spring upon undue strain upon the parts.

5. In a mowing machine, a main frame, a pole extending forwardly from said frame, a cutter bar head, a sleeve slidably mounted upon said pole, an equalizing member pivotally connected to said pole, means for pivotally connecting said equalizing member to said cutter head, means for pivotally connecting said sleeve with said equalizing member, a hitch device for a tractor, means for detachably connecting said hitch device with said sleeve, and spring means for regulating said last mentioned means whereby said last mentioned means is releasable under overload.

6. In a mowing machine, a main frame, a pole extending forwardly of said frame, a cutter bar head, a sleeve slidably mounted upon said pole, an equalizing member pivotally connected to said pole, means for pivotally connecting said equalizing member to said cutter head, means for pivotally connecting said sleeve with said equalizing member, a clevis associated with said sleeve, means for detachably connecting said clevis and sleeve, and spring means for regulating said last mentioned means whereby said last mentioned means is releasable under overload.

7. In a mowing machine, a main frame, a pole extending forwardly of said frame, a cutter bar head, a sleeve slidably mounted upon said pole, an equalizing member pivotally connected to said pole, means for pivotally connecting said equalizing member to said cutter bar head, means for pivotally connecting said sleeve with said equalizing member, a clevis associated with said sleeve, a spring pressed latch pivotally connected with said sleeve, the free end of which is inclined, and a member on said clevis engageable with the inclined portion of said latch whereby when undue load is placed upon the parts the latch will be forced out of engagement with said member and release the clevis from said sleeve.

WILHELM VUTZ.